(12) United States Patent
Wan

(10) Patent No.: US 7,017,108 B1
(45) Date of Patent: Mar. 21, 2006

(54) METHOD AND APPARATUS FOR REPRODUCING A LINEAR DOCUMENT HAVING NON-LINEAR REFERENTIAL LINKS

(75) Inventor: Ernest Yiu Cheong Wan, Carlingford (AU)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/392,550

(22) Filed: Sep. 9, 1999

(30) Foreign Application Priority Data

| Sep. 15, 1998 | (AU) | ................................. PP5955 |
| May 10, 1999 | (AU) | ................................. PQ0282 |

(51) Int. Cl.
  *G06F 17/00* (2006.01)
(52) U.S. Cl. .................. 715/501.1; 715/513
(58) Field of Classification Search ............. 707/501.1, 707/513; 345/765, 776, 777; 358/1.15, 358/1.18; 715/501.1, 513, 514
  See application file for complete search history.

(56) References Cited

U.S. PATENT DOCUMENTS

| 5,337,161 A | * | 8/1994 | Hube .......................... 358/448 |
| 5,380,043 A | * | 1/1995 | Schwartz ..................... 281/15.1 |
| 5,519,501 A | * | 5/1996 | Hamilton ..................... 358/296 |
| 5,632,022 A | * | 5/1997 | Warren et al. .............. 345/776 |
| 5,890,173 A | * | 3/1999 | Yoda ........................... 707/501 |
| 5,900,876 A | * | 5/1999 | Yagita et al. ................ 345/776 |
| 5,950,214 A |   | 9/1999 | Rivette et al. .............. 707/512 |
| 6,037,941 A | * | 3/2000 | Goto ........................... 345/777 |
| 6,185,588 B1 | * | 2/2001 | Olson-Williams et al. .. 715/515 |
| 6,223,177 B1 | * | 4/2001 | Tatham et al. ................. 707/9 |
| 6,268,851 B1 | * | 7/2001 | Bricklin et al. ............. 345/744 |
| 6,310,630 B1 | * | 10/2001 | Kulkarni et al. ............ 345/776 |

FOREIGN PATENT DOCUMENTS

| AU | A-83194/98 | | 3/1999 |
| EP | 775962 A2 | * | 5/1997 |
| JP | 9-146719 | | 6/1997 |

* cited by examiner

*Primary Examiner*—Sanjiv Shah
(74) *Attorney, Agent, or Firm*—Fitzpatrick, Cella, Harper & Scinto

(57) ABSTRACT

A method of creating a document suitable for hard copy reproduction is disclosed. Information from at least one source is obtained, the information including a plurality of referential links establishing corresponding referential paths between components of the information. A physical structure of the document to be formed is established, and a plurality of document links are defined corresponding to the referential links. A user interpretable functional link is assigned to each document link; and the number of user interpretable functional links is optimized by assigning plural ones of the document links to at least an individual one of the functional links.

48 Claims, 10 Drawing Sheets

METHOD AND APPARATUS FOR REPRODUCING A LINEAR DOCUMENT HAVING NON-LINEAR REFERENTIAL LINKS

FIELD OF THE INVENTION

The present invention relates to the preparation of hypermedia documents that retain their hyperlinks in the printed copy and, in particular, to an authoring system for providing a near-optimal assignment of physical links to hyperlinks.

BACKGROUND

Hypermedia documents are computer-based electronic documents that contain text, graphics, audio and video on pages that are connected by navigational links. The navigational links, often referred to as the hyperlinks, permit non-sequential or non-linear traversal of the document by the readers. A well-known source of hypermedia documents is the so-called World Wide Web (WWW) or simply, "the Web".

Hypermedia documents allow multiple simultaneous views and efficient non-linear exploration of information that are not possible with conventional printed documents such as books. On the other hand, unlike books, the absence of an obvious linear structure and a sense of physical orientation in hypermedia documents allows users to become easily lost in the hyperspace of the document.

Although hypermedia documents may be printed, the hyperlinking functionality is typically lost in the printed copy. Most hypermedia documents, especially those on the Web are intended for viewing on the screen and designed to exploit the hyperlinking functionality. As a result, readability also suffers with the loss of the hyperlinks. For instance, removing the hyperlink to the definition of an unfamiliar term may make a description unclear to the readers.

Australian Patent Publication No. AU-A-83194/98 (Attorney Ref: 432345 CFP0954AU MMedia02), corresponding to United States of America patent application Ser. No. 09/148,475 discloses a method for forming hypermedia documents that retain their electronic hyperlinks as physical hyperlinks within the printed reproduction of the document. The method associates the hyperlinks with cut-outs or tabs on the edges of the pages and lines or other indicia printed onto the page. To traverse a hyperlink, the reader follows the indicia, places a finger or thumb within the cut-out, locates the first uncut page surface below the cut-out and opens that page.

As the number of hyperlinks increase, it is apparent that the number of cut-outs and thus hyperlinks, is limited by the physical dimensions of the pages. It is therefore desirable to reuse the cut-outs for multiple hyperlinks and optimise their assignment.

SUMMARY OF THE INVENTION

In accordance with one aspect of the present invention there is disclosed a method of creating a document suitable for hard copy reproduction, said method comprising the steps of:

receiving information from at least one source, said information including a plurality of referential links establishing corresponding referential paths between components of said information;

defining a physical structure of said document sufficient to reproduce said information;

defining a plurality of document links corresponding to said referential links;

assigning a user interpretable functional link to each said document link; and optimising a number of said user interpretable functional links by assigning appropriate plural ones of said document links to individual ones of said functional links.

In accordance with another aspect of the present invention there is disclosed an authoring system for the creation of a linear document having non-linear referential links, said system including:

means for specifying a linear document structure and the hyperlinks of a hypermedia document;

means for associating said hyperlinks with physical links able to be formed in pages of said linear document;

means for modelling each said physical link using a one-dimensional vector; and means for optimising an assignment of said physical links to one or more of said hyperlinks.

In accordance with another aspect of the present invention there is disclosed an authoring system for the creation of a linear document having non-linear referential links, said system comprising:

means for assessing hyperlinks within a source hypermedia document to which a linear document structure is to be applied;

means for associating said hyperlinks with physical links able to be formed in pages of said linear document;

means for modelling each said physical link using a one-dimensional vector; and means for optimising an assignment of said physical links to one or more of said hyperlinks.

In accordance with another aspect of the present invention there is disclosed a system for the creation of a linear document having non-linear referential links, said system comprising:

means for assessing hyperlinks within a source hypermedia document to which a linear document structure is to be applied;

means for associating said hyperlinks with physical links able to be formed in pages of said linear document;

means for modelling each said physical link using a one-dimensional vector;

means for optimising an assignment of said physical links to one or more of said hyperlinks;

means for applying said linear document structure and said optimised physical links to said hypermedia document to produce said linear document; and means for reproducing said linear document.

In accordance with another aspect of the present invention there is disclosed a computer program product incorporating a computer readable medium incorporating a series of instructions for creating a document suitable for hard copy reproduction, said instructions implementing the steps of:

receiving information from at least one source, said information including a plurality of referential links establishing corresponding referential paths between components of said information;

defining a physical structure of said document sufficient to reproduce said information;

defining a plurality of document links corresponding to said referential links;

assigning a user interpretable functional link to each said document link; and optimising a number of said user interpretable functional links by assigning plural ones of said document links to at least an individual one of said functional links.

A printable document and printed document arising from these aspects are also disclosed.

BRIEF DESCRIPTION OF THE DRAWINGS

A preferred embodiment of the present invention will now be described with reference to the drawings in which.

DETAILED DESCRIPTION

The preferred embodiment of the present invention is described as a computer application program hosted on the Windows™ operating system developed by Microsoft Corporation. However, those skilled in the art will recognise that the described embodiment may can be implemented on computer systems hosted by other operating systems. For example, the preferred embodiment can be performed on computer systems running UNIX™, or OS/2™. The application program has a user interface which includes menu items and controls that respond to mouse and keyboard operations. The application program has the ability to transmit data to one or more printers either directly connected to a host computer or accessed over a network. The application program also has the ability to transmit and receive data to a connected digital communications network (for example the "Internet").

Figure 9:
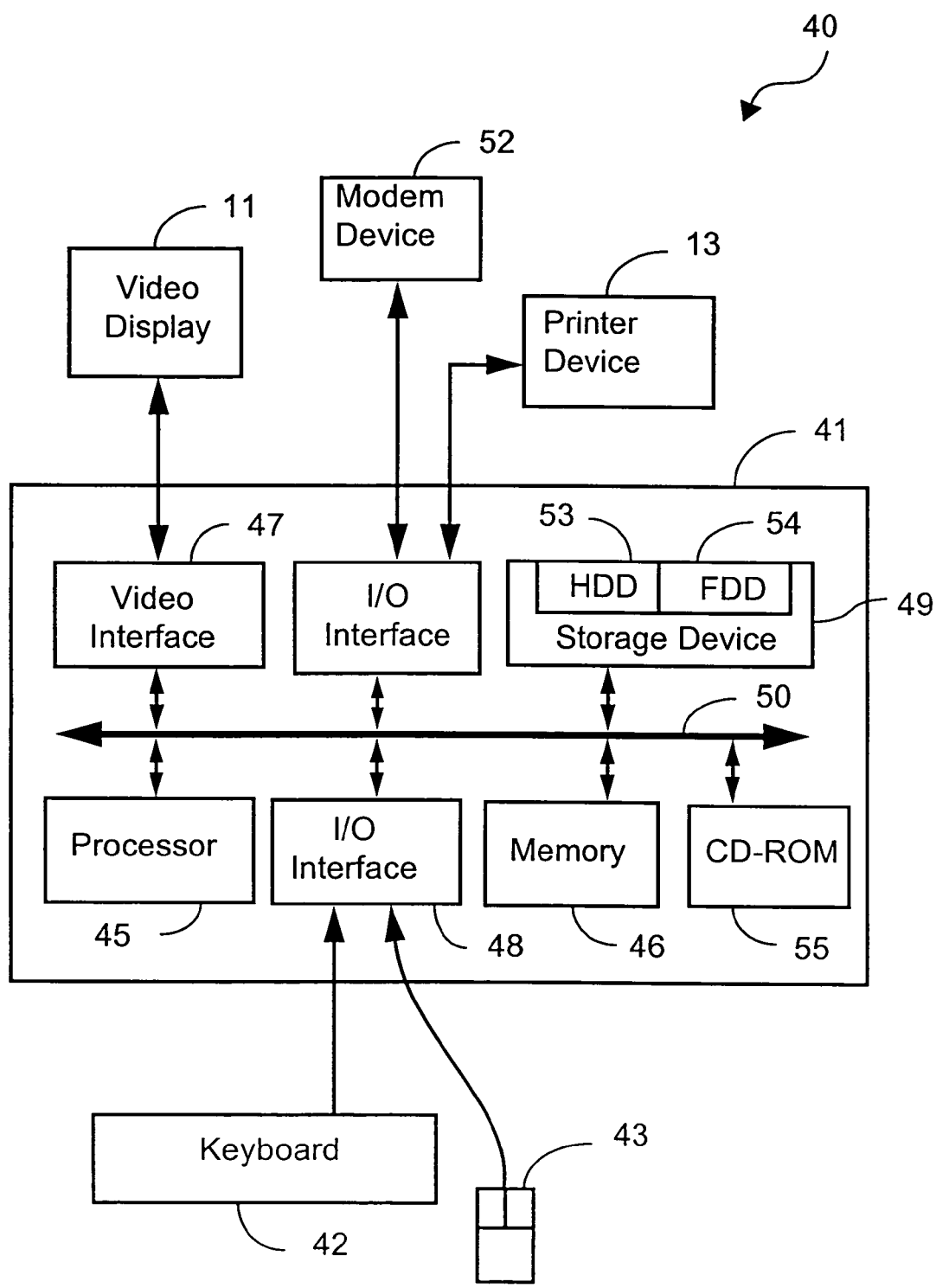
FIG. 9 is a block diagram of a general purpose computer upon which the preferred embodiment of the present invention can be practiced.

The preferred embodiment of the invention can be practised using a conventional general-purpose (host) computer system, such as the computer system 40 shown in FIG. 9, wherein the application program discussed above and to be described with reference to the other drawings is implemented as software executed on the computer system 40. The computer system 40 comprises a computer module 41, input devices such as a keyboard 42 and mouse 43, and output devices including a printer 13 and a display device 11. A Modulator-Demodulator (Modem) transceiver device 52 is used by the computer module 41 for communicating to and from a computer network, for example connectable via a telephone line or other functional medium. The modem 52 can be used to obtain access to the Internet, and other network systems.

The computer module 41 typically includes at least one processor unit 45, a memory unit 46, for example formed from semiconductor random access memory (RAM) and read only memory (ROM), input/output (I/O) interfaces including a video interface 47, and an I/O interface 48 for the keyboard 42 a mouse 43 and optionally a joystick (not illustrated). A storage device 49 is provided and typically includes a hard disk drive 53 and a floppy disk drive 54. A CD-ROM drive 55 is typically provided as a non-volatile source of data. The components 45 to 49 and 53 to 55 of the computer module 41, typically communicate via an interconnected bus 50 and in a manner which results in a conventional mode of operation of the computer system 40 known to those in the relevant art. Examples of computers on which the embodiments can be practised include IBM-PC/ATs and compatibles, Sun Sparcstations or alike computer systems evolved therefrom. Typically, the application program of the preferred embodiment is resident on a hard disk drive 53 and read and controlled using the processor 45. Intermediate storage of the program, generated data such as a print list, and any data fetched from the network may be accomplished using the semiconductor memory 46, possibly in concert with the hard disk drive 53. In some instances, the application program may be supplied to the user encoded on a CD-ROM or floppy disk, or alternatively could be read by the user from the network via the modem device 52. In such instances, the disk or network form a computer program product for provision of the application program to the computer system 40 for implementation thereby.

Figure 1:
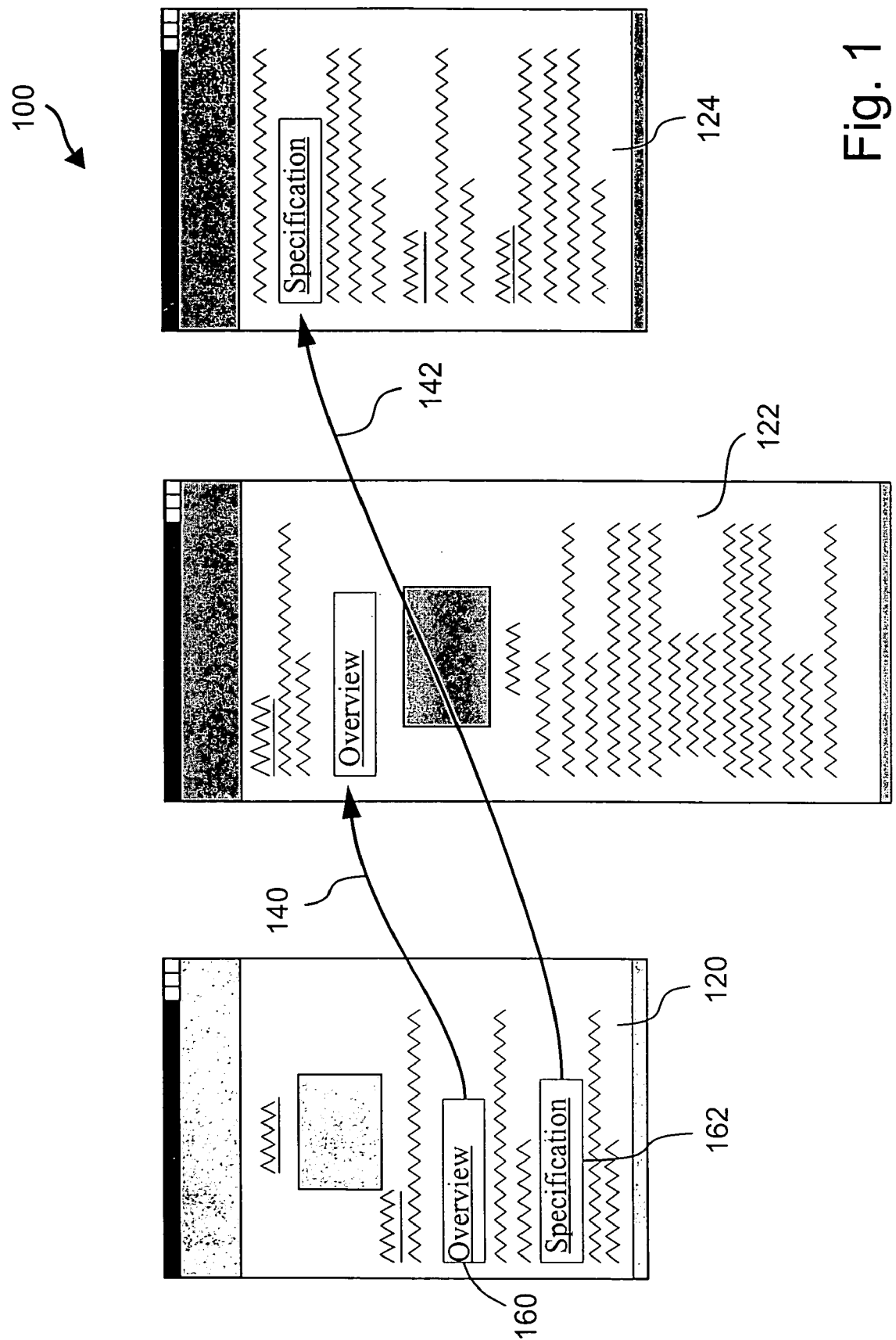
FIG. 1 is an example of a typical electronic hypermedia document obtained from the World Wide Web.

Referring to FIG. 1, an electronic multi-page hypermedia document 100 is shown which illustrates a typical layout of multi-media content spread over separate electronic pages 120, 122, 124 which also include hyperlinks 140, 142, and which is typically displayed to a user of the computer system 40 via the video display 11. It will be appreciated that the pages 120–124 may depict only some of the pages and hyperlinks within the document 100. Navigating through the pages is accomplished by traversing the hyperlinks initiated by a signal such as a clicking of the mouse 43 or a finger-touch on hyperlink anchors 160 and 162, where a touch-sensitive display is used. For instance, selecting the anchor 160 of hyperlink 140 will cause page 122 to be displayed on the display 11, whilst selecting an anchor 162 of hyperlink 142 will cause page 124 to be displayed. The functionality of the hyperlinks is to be retained in a printed copy reproduction of the document 100.

Figure 2:
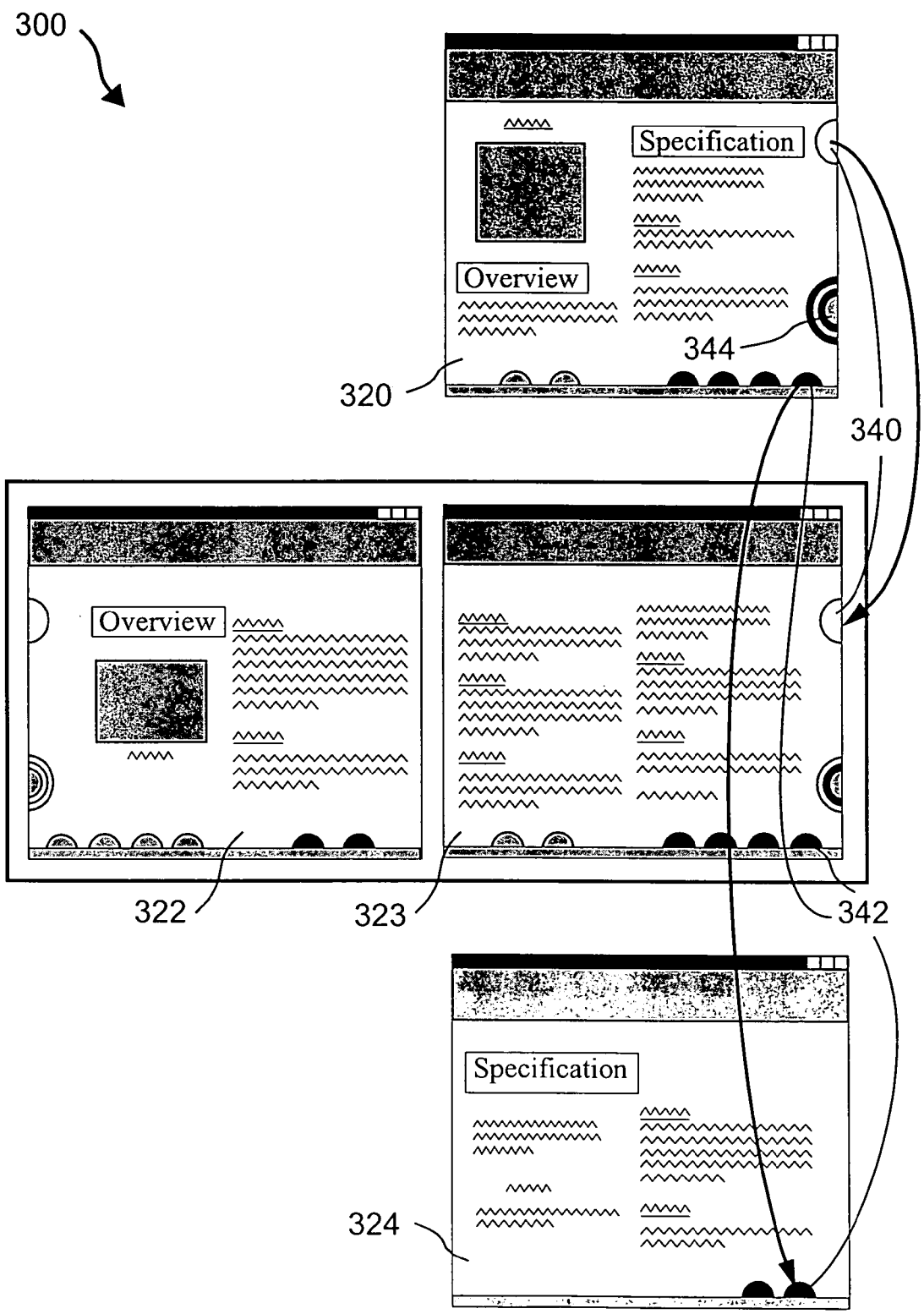
FIG. 2 shows an electronic hard-copy reproducible hypermedia document constructed from that of FIG. 1 using the method described by the aforementioned Australian Patent Publication.
Figure 3:
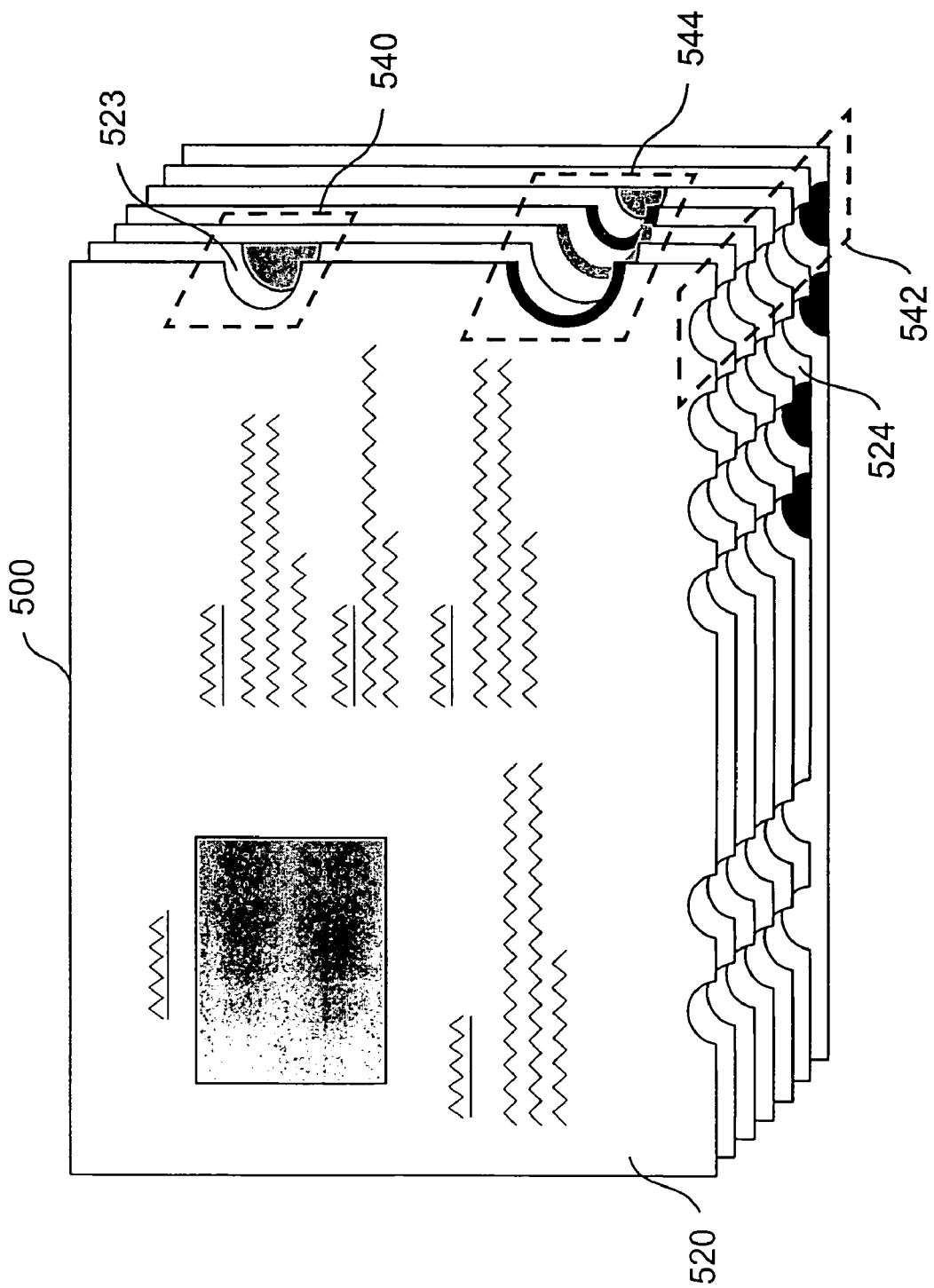
FIG. 3 shows the printed version of the electronic hypermedia document of FIG. 2.

FIG. 2 shows an equivalent electronic multi-page hard copy reproducible hypermedia document 300 constructed from the document 100 in accordance with the method described in the aforementioned Australian Patent Publication, and which allows the converted document 300 to retain the hyperlinks of the document 100 in the printed copy. The content pages of the document 100 are reformatted to satisfy the physical constraints of the print media. In the example shown, pages 120 and 124 of the document 100 are laid out on odd-numbered printable pages 320 and 324 respectively, while page 122 of document 100 is split into an even-numbered page 322 and an odd-numbered page 323. FIG. 3 depicts a printed version 500 of the document 300, wherein the electronics pages 320 and 322 of the document 300 are printed on the two sides of the physical page 520, and the electronics pages 323 and 324 are printed on the odd-numbered side of the physical pages 523 and 524 respectively.

In this example, the electronic hyperlinks of the document 100 are associated with cut-outs on the edges of the pages. To traverse a hyperlink, the reader places a finger or thumb within the cut-out, locates the first uncut page surface below the cut-out and opens at that page. In the document 300, the hyperlinks 140, 142 of the document 100 become associated with tabs 340 and 342 respectively which form cut-outs 540 and 542 in the printed copy 500 of FIG. 3, thereby retaining the hyperlinking functionality of the original document 100. On page 320 of the document 300, selecting the tab 340 causes the page 322 to be displayed in a one-page mode and both pages 322 and 323 to be displayed in a two-page mode. Moreover, on page 320, selecting the tab 342 causes page 324 to be displayed in one-page display mode and page 324 and its opposite page to be displayed in a two-page display mode. Note that tab 342 is not active on page 323 as indicated, in this particular implementation, through the absence of an appropriate label.

Due to the limited amount of space on the edges of the printed copy, it is possible that some hyperlinks in an electronic hypermedia document cannot be retained in its corresponding printed copy as cut-out tabs. While the number of cut-out tabs that can be made along the edges is limited, under certain conditions and in accordance with embodiments of the present invention, it is possible to assign multiple hyperlinks to one cut-out tab. Moreover, according to further embodiments, related hyperlinks can be grouped to form a set of nested tabs of progressive size along a single axis, for instance, the tab 344 in document 300 and corresponding cut-out 544 in the printed version 500. When using a set of nested tabs, the user selects which hyperlink to traverse by simply moving the thumb or finger slightly to grasp the desired size of the cut-out in the printed version.

The preferred embodiment optimises the assignment of the cut-outs and other physical hyperlinks. More specifically, the preferred embodiment provides a mathematical model for describing hyperlinks and cut-out tabs and uses the model to optimise the number of tabs and axes that are required for implementing a given set of hyperlinks. The preferred embodiment will be explained using a particular authoring system that creates hypermedia documents with physical hyperlinks. It will be appreciated that the present invention can be used in other authoring processes as well as in processes that convert existing electronic hypermedia documents to a format that supports physical hyperlinks.

A physical hyperlink from an anchor (or hot-spot) on page S to a target on page T can be represented by a data structure comprising of the 1-dimensional vector $\overrightarrow{ST}$ describing the path traversed by the hyperlink and the location of the target page, that is, the page number of T. Since hyperlinks are typically implemented physically as cut-out tabs and can operate or be used in either a forward or a backward direction, bi-dimensional vectors are involved. The same basic data structure is used to represent the cut-out tabs. Each physical hyperlink in the document is typically associated with one cut-out tab. However, a number of hyperlinks may be able to share one cut-out tab. The preferred embodiment involves a process that starts with a set of cut-out tabs each representing one hyperlink of the hypermedia document. The set of cut-out tabs is then gradually reduced by combining cut-out tabs which can serve multiple hyperlinks.

Other physical attributes such as the size of the tabs and the page, as well as certain system parameters such as the edges to be used for tabs, the maximum number of tabs that can be nested along a single axis and the density of the tabs along an edge are required when optimizing the placement of the cut-out tabs and are typically retained in a tab data structure. Additional attributes such as the location of the tabs on an edge, the shape of the tabs, the colors and labels used by the tabs, etc. are required when producing the tabs. Default values or user's inputs can be used for the value of those attributes that are not set by the optimization process. The user (ie. the document author) is desirably allowed to examine the results of the optimization process and make adjustments as required.

A tab running from S to T has to pass through all the pages in between and is visible, although not necessarily required by those pages. Appropriate presentational style may be used to distinguish an inactive tab from an active tab, for instance by removing or greying out the label of a tab when it has no associated hyperlink. An array is added to the data structure of the cut-out tab to store the status of the tab for the intermediate pages. In case the tab is shared by multiple hyperlinks, a second array is used to store the labels of the tab for the intermediate pages. Hereafter, depending on the context, the notation ST is used to denote a hyperlink or a cut-out tab from page S to page T. In addition, FIGS. 4A to 4D show graphical notations used in the preferred embodiment to depict the cut-out tabs diagrammatically. The graphical notations can also be used in the graphical user interface (GUI) of an authoring system or editing tool to visualize the assignment and the physical arrangement of the tabs.

Figure 4A:
FIGS. 4A to 4D summarize graphical notations of physical hyperlinks used in the preferred embodiment.

FIG. 4A shows a vertical bar which is used to denote a section, which is a set of one or more consecutive pages. The identifiers above the vertical bar denote the end points of the hyperlinks that start or end at the section, that is, the anchors and targets defined within the section.

Figure 4B:
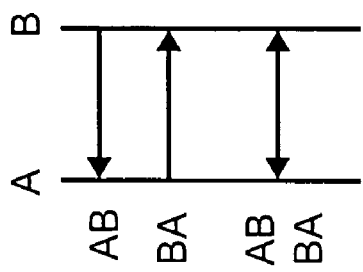

A cut-out tab is denoted by an arrow as shown in FIG. 4B. A left pointing arrow represents a forward link and a right pointing arrow represents a backward link. An arrow with arrow head at both ends is used to represent a bi-directional tab that provides both a forward and a backward link. The arrow is labelled. The label indicates the hyperlinks that are associated with the tab. The label has the format ST where S is the identifier of the anchor and T is the indentifier of the target.

Figure 4C:
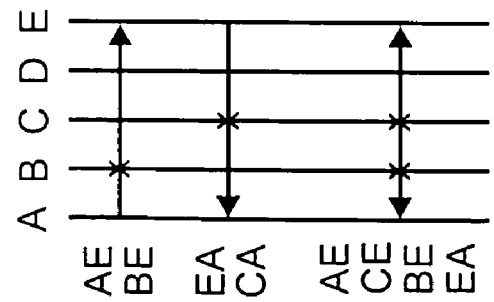

In order to denote a cut-out tab that is shared by a set of hyperlinks, as shown in FIG. 4C, a cross is placed at the anchor section of each hyperlink except the outermost one along the arrow that represents the tab.

Figure 4D:
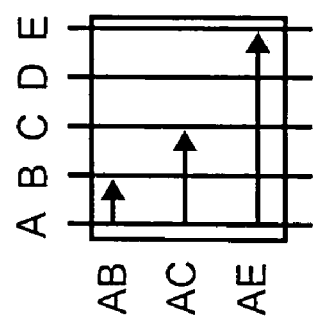

As shown in FIG. 4D, a set of arrows enclosed in a rectangular box denotes a set of nested cut-out tabs.

Figure 5:
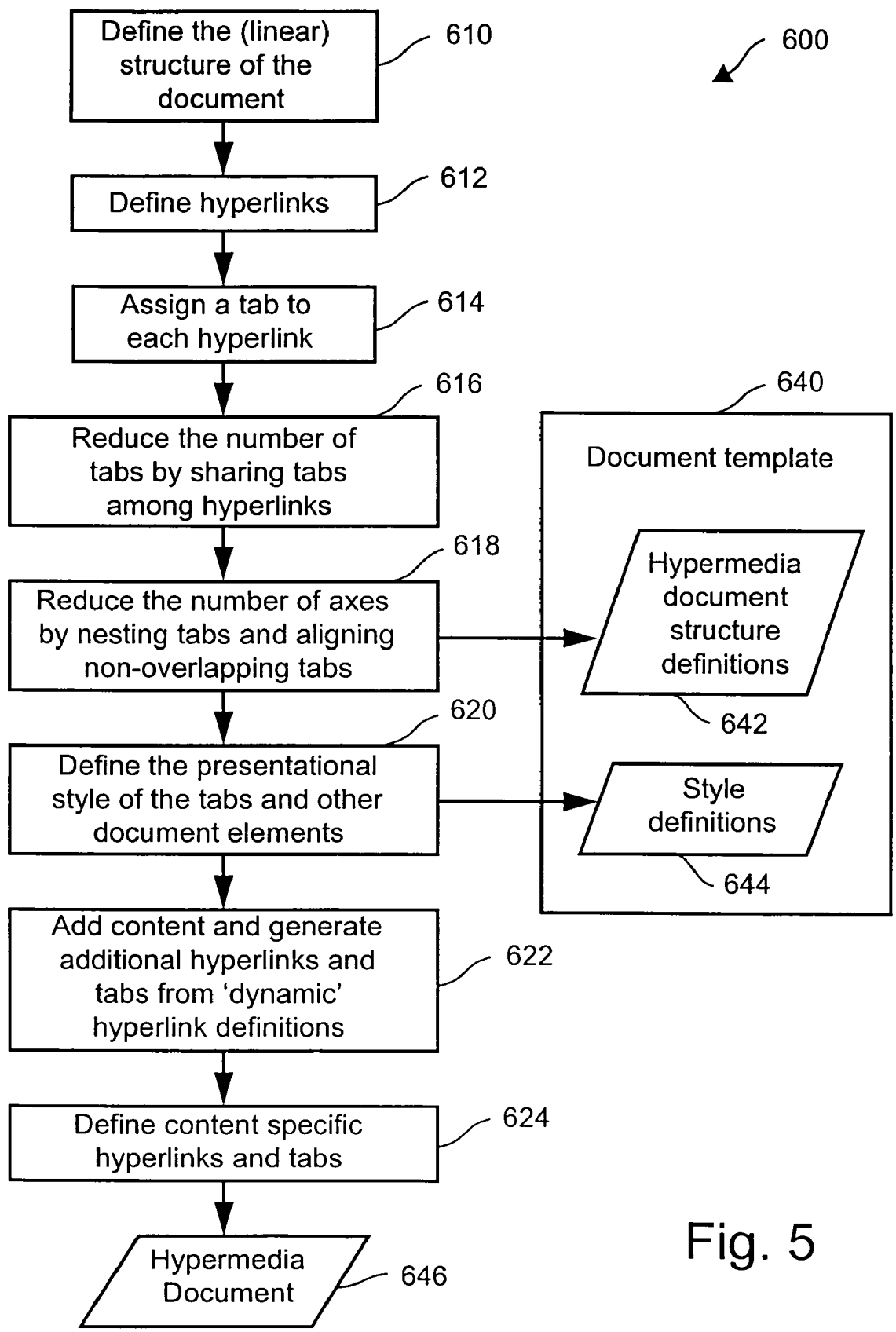
FIG. 5 is a flow diagram of the preferred embodiment of the authoring system that creates hypermedia document templates or hypermedia documents with physical hyperlinks.
Figure 6:
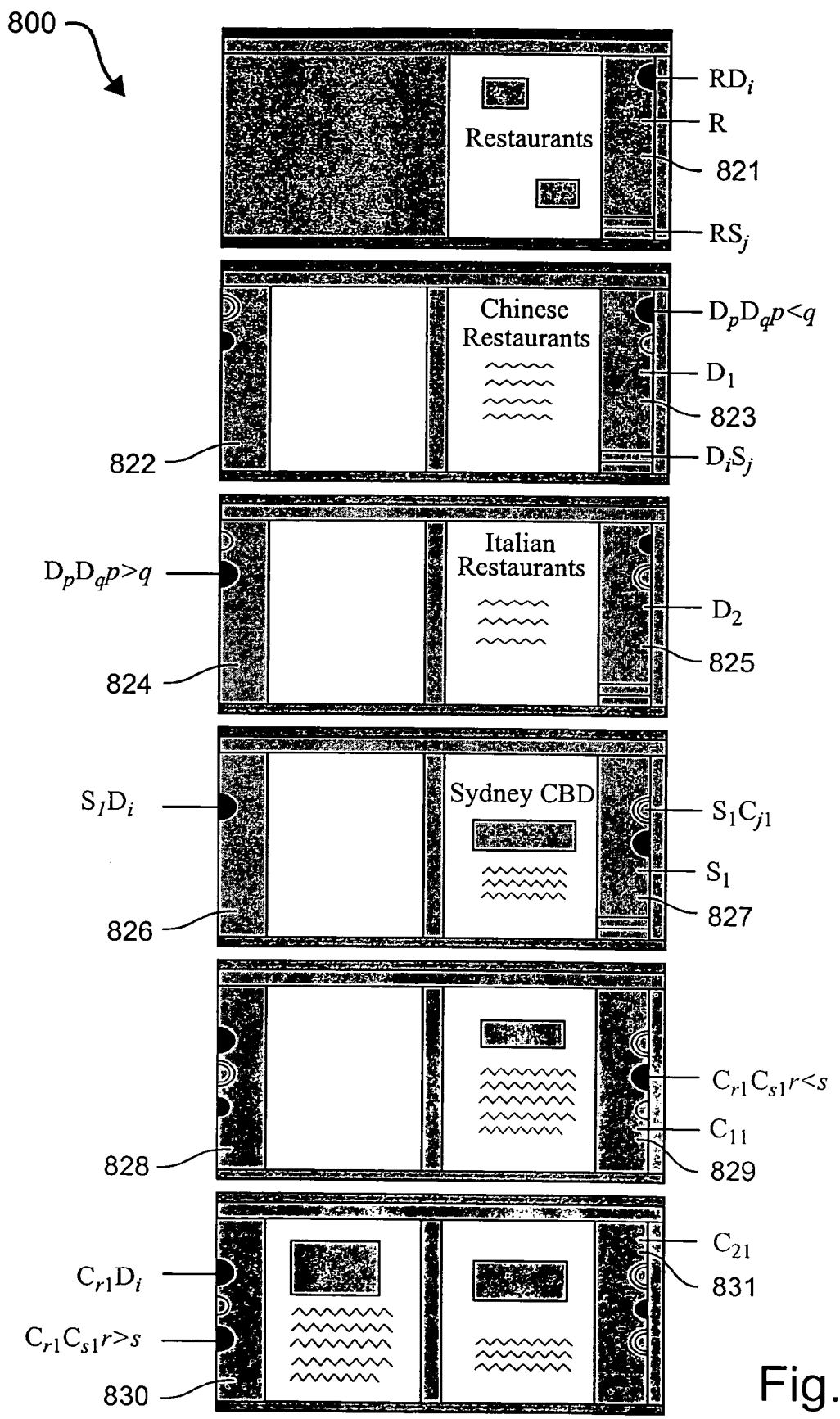
FIG. 6 provides an example of a restaurant's guide created using the authoring system of FIG. 5.
Figure 7:
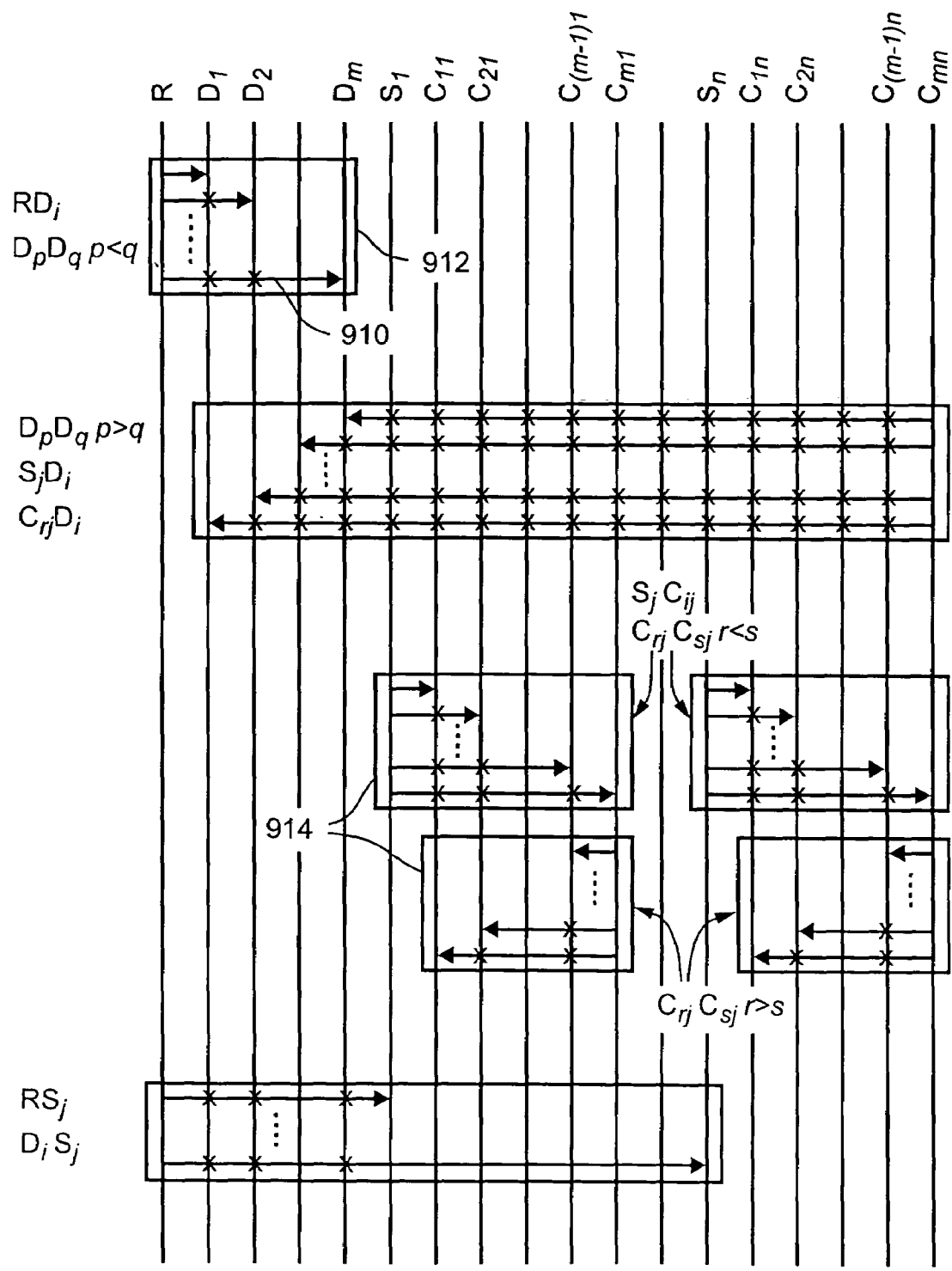
FIG. 7 is a diagrammatic representation of the cut-out tabs of the restaurant's guide of FIG. 6.

FIG. 5 shows the preferred embodiment of a system 600 for authoring hypermedia documents with physical hyperlinks. The system 600 optimises the assignment of hyperlinks to cut-out tabs. FIG. 6 shows, in two-page display mode, the representative pages of a hyperlinked restaurant's guide 800 created by the system 600. FIG. 7 shows the diagrammatic representation of the cut-out tabs of the restaurant's guide 800. The restaurant's guide will be used as an example in the description of the system 600.

FIG. 6 illustrates the starting page of the main sections of the restaurant's guide 800. The sections are defined as indicated in step 610 of FIG. 5 which provides the linear structure of the document 800. Each section is a group of related pages and has an associated identifier. The root (or starting) pages of document 800 is denoted as R, followed by the restaurant directories $D_i$, for m types of cuisines, where i=1, ..., m. The restaurants are also grouped into sections related to the suburb in which each is located, one for each of the n listed suburbs. Each suburb section has an overview page $S_j$ and m cuisine sub-sections $C_{ij}$, i=1, ..., m, one for each of the m cuisines where $1 \leq j \leq n$. In summary, the document 800 has the (linear) structure:

R $D_1$ $D_2$ ... $D_m$ $S_1$ $C_{11}$ $C_{21}$ ... $C_{m1}$ ... $S_n$ $C_{1n}$ $C_{2n}$ ... $C_{mn}$

To allow the document 800 to be traversed in a non-linear manner among the various sections, a number of hyperlinks are defined in step 612. Using the graphical notations of FIGS. 4A to 4D, the hyperlinks are denoted as indicated in Table 1. In step 614, each of these hyperlinks is assigned a tab.

TABLE 1

| Hyperlinks | Description |
|---|---|
| $RD_i$, i = 1, ..., m | from the root page to each cuisine directory |
| $D_r D_s$, r, s = 1, ..., m r ≠ s | from each cuisine directory to another cuisine directory |
| $D_i S_j$, i = 1, ..., m, j = 1, ..., n | from each cuisine directory to each suburb section |
| $S_j D_i$, i = 1, ..., m, j = 1, ..., n | from each suburb section to each cuisine directory |
| $RS_j$, j = 1, ..., n | from the root page to each suburb section |
| $S_j C_{ij}$, i = 1, ..., m, j = 1, ..., n | from each suburb section to each corresponding local cuisine sections |
| $C_{rj} C_{sj}$, r, s = 1, m, r ≠ s, j = 1, ..., n | from each cuisine section of a suburb to the other cuisine sections of the same suburb |
| $C_{rj} D_i$, r, i = 1, ..., m j = 1, ..., n | from each cuisine section of a suburb to the cuisine directories |

Note that hyperlink definitions can be either "static" or "dynamic". $RD_i$ and $C_{rj}C_{sj}$ are two examples of a "dynamic" hyperlink definition. In the case of $RD_i$, a hyperlink is generated between the "static" document element R and every occurrence of the "dynamic" document element D. In the case of $C_{rj}C_{sj}$, a hyperlink is generated between every occurrence of two "dynamic" document elements. In contrast, a "static" hyperlink definition defines a fixed hyperlink between two "static" document elements.

In step 616, the number of tabs is reduced by assigning multiple hyperlinks to some of the tabs. A tab can be used for multiple hyperlinks that ended at the same page as the tab. In fact, a tab AB can potentially be used for all hyperlinks starting at section A or at a section between A and B and ended at section B provided that the tab is properly labelled on all the pages it passes through and that such use is not confusing to the reader. For instance, tab 910 of FIG. 7 running from R to $D_m$ is shared by hyperlinks $RD_m$ and $D_p D_m$ where p=1, ..., m−1. In addition, a tab leading from a page A to a page B provides an implicit return path from page B to page A. Hence, the number of tabs can be reduced by merging tab pairs that have their two tabs start on the page at which other tab ends.

In step 618, related tabs are nested to reduce the total number of axes required. Nesting tabs on the same axis allows hyperlinks with different target pages to share the same axis therefore making available edge space for other tabs. However, the overall size of the resulting set of nested tabs is larger than a normal tab. Hence, the saving is not exactly n fold for nesting n tabs. Moreover, indiscriminate nesting of tabs may introduce artificial grouping of otherwise unrelated content and confuse the reader. Hence, a set of nested tabs is preferably used only where a natural, logical or determinable relationship exists among the linked materials. Such relationship may be inferred from the structure of the documents. For instance, the set of nested tabs 912 of FIG. 7 are used for assessing the m restaurant directories each for a different cuisine. In this case, the nesting of tabs reduces the number of axes required from m to 1.

Steps 616 and 618 can be fully-automated. However, an editing tool that allows the user to adjust the resulting hyperlinks/cut-out tabs assignment interactively is sometimes desirable.

In step 620, presentational style such as the location, colour, size, shape, etc. of the tabs are defined along with the presentational style of the other elements of the documents such as those of the headers, paragraphs, tables, lists, etc. A number of presentational styles 644 can be defined to allow the document to be presented in different ways.

The structural definitions 642 of the hypermedia document created as a result of steps 610 to 618 and the style definitions 644 created as a result of step 620 can be saved and used as a document template 640 for creating documents of the same type in the future. In the case of the restaurant's guide example of FIG. 6, XML and XSL are used for defining the structure and the style of the document respectively while the hypermedia document 646 is generated in HTML format.

In step 622, content is added either interactively using an editor or from data files using a loader or both. Additional hyperlinks and tabs are generated from the "dynamic" hyperlink definitions. It will be appreciated that all copies of the tabs generated from a "dynamic" hyperlink definition can use the same set of axes. For instance, in FIG. 7, the $RD_i$'s use a single set of nested tabs 912 and the $C_{rj}C_{sj}$'s use the same two axes for their nested tabs 914.

After the content is added, new content specific hyperlinks and their associated tabs can be defined if required as indicated in step 624. The number of new tabs can also be reduced using the same methods used in step 616 and 618.

It will be appreciated that the hyperlinks in the resulting hypermedia document 646 are optimally or near-optimally assigned to the cut-out tabs that serve as physical hyperlinks in the printed copy.

Figure 8A:
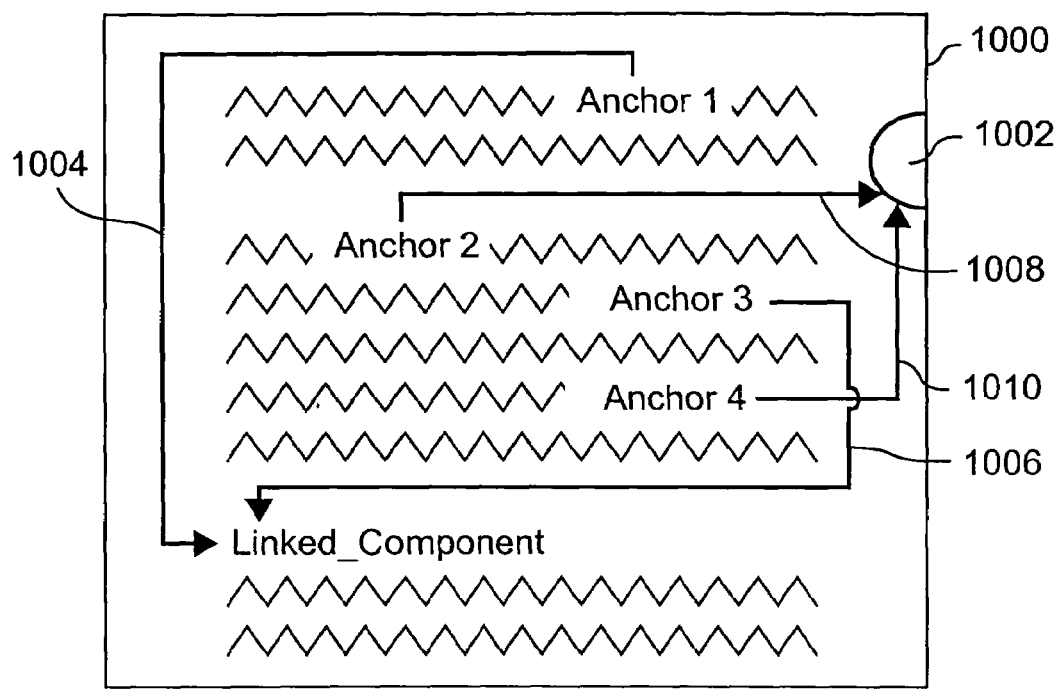
FIGS. 8A and 8B illustrate optimisation of hyperlinks within a page.

Although the forgoing embodiment describes optimising the hyperlinks spread across a number of page using cut-out tabs, the same optimising principles may be applied to individual pages and links on those pages. FIG. 8A shows a traditional arrangement of a hyperlinked page 1000 which includes four hyperlink anchors (Anchor 1–Anchor 4) and two hyperlink destinations, one being a cut-out tab 1002 formed in the page 1000, and the other being a Linked_Component printed on the page 1000. As seen, printed hyperlinks 1004 and 1006 (printed lines on the page) directly connect the Anchor 1 and Anchor 3 respectively to the Linked_Component. Similarly, hyperlinks 1008 and 1010 directly connect Anchor 2 and Anchor 4 respectively to the cut-out tab 1002. It is apparent from FIG. 8A that some amount of optimisation may be made in order to maximise the available space on the page 1000.

Figure 8B:
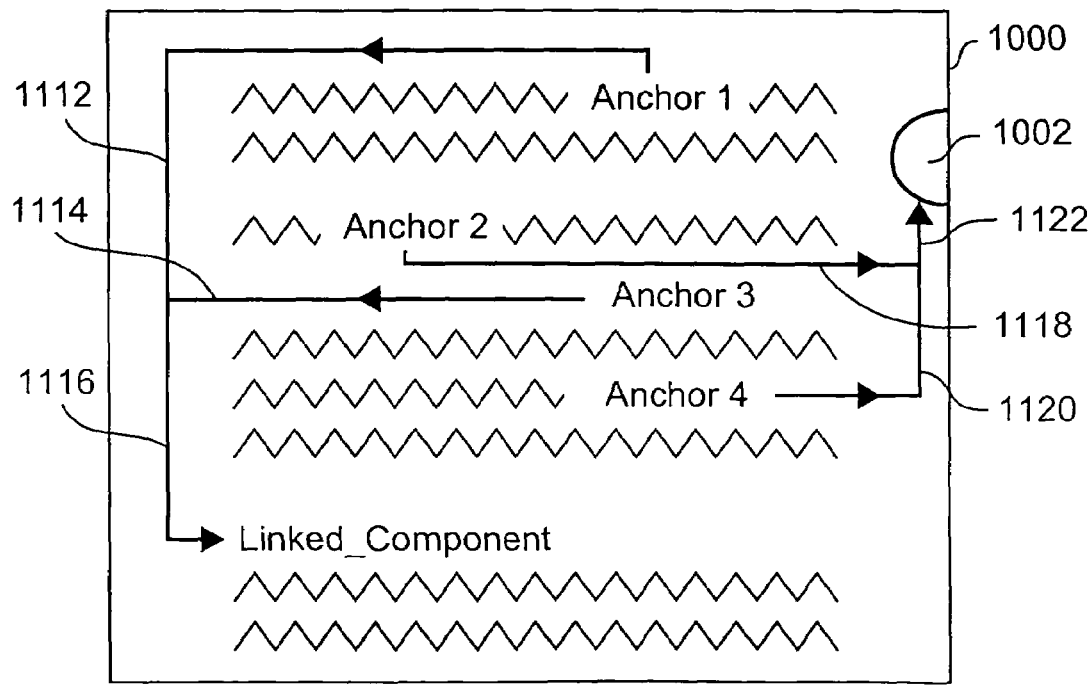

FIG. 8B shows how the page 1000 may be optimised according to another embodiment. As with the multi-page cut-out cases described above, here hyperlinks that point to the same destination are combined as best possible within the confines of the document to minimise the number of links on the page. As seen in FIG. 8B, the printed hyperlinks are altered in their placement on the page with printed hyperlinks 1112 and 1114 from Anchor 1 and Anchor 3 respectively merging into a hyperlink 1116 which accesses Linked_Component. Similarly, hyperlinks 1118 and 1120 from Anchor 2 and Anchor 4 respectively, merge into a hyperlink 1122 which access the cut-out 1002. In this fashion it is seen that the application of the optimisation process can reduce the space used by the hyperlinks internally referencing a single page.

Whilst the example of FIG. 8B demonstrates the use of printed lines as hyperlink indicia, other indicia may be used. For example, graphic symbols and the like may substitute for the printed lines to provide to the reader the same referential link that otherwise would have been provided in an electronically linked document.

According to the various principles of the embodiments described above, a further embodiment makes use of a knowledge-based sub-system configured to interpret the main knowledge associated with each hyperlink in order to decide if and how certain hyperlinks can be grouped together thus permitting the grouped hyperlinks to be assigned to a set of nested tabs within a hyperlinked documents. Whilst it is possible for grouping of information within the document to be based upon the inherent structure of the electronic document from which the hyperprint physical document is to be derived, such is limited to the extent of structure incorporated in the electronic document and requires the author of the electronic document to specify every grouping interactively. This can be a tedious process and is not a practical solution where the principles of the present invention are intended to provide for the automated translation of a hyperlinked electronic document to a hyperlinked text document.

Figure 10A:
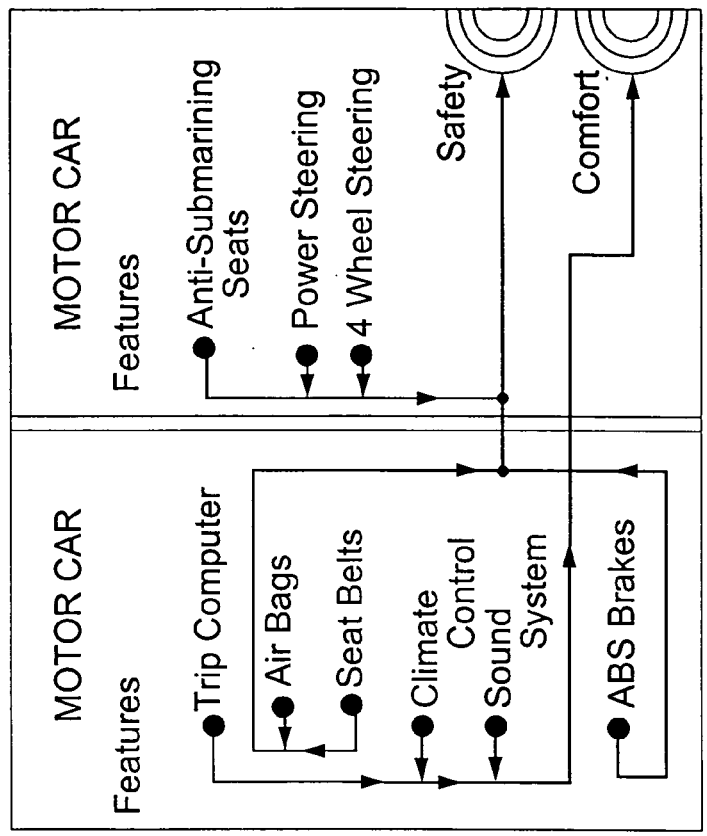
FIG. 10A depicts an example of a prior-art hypermedia document.
Figure 10B:
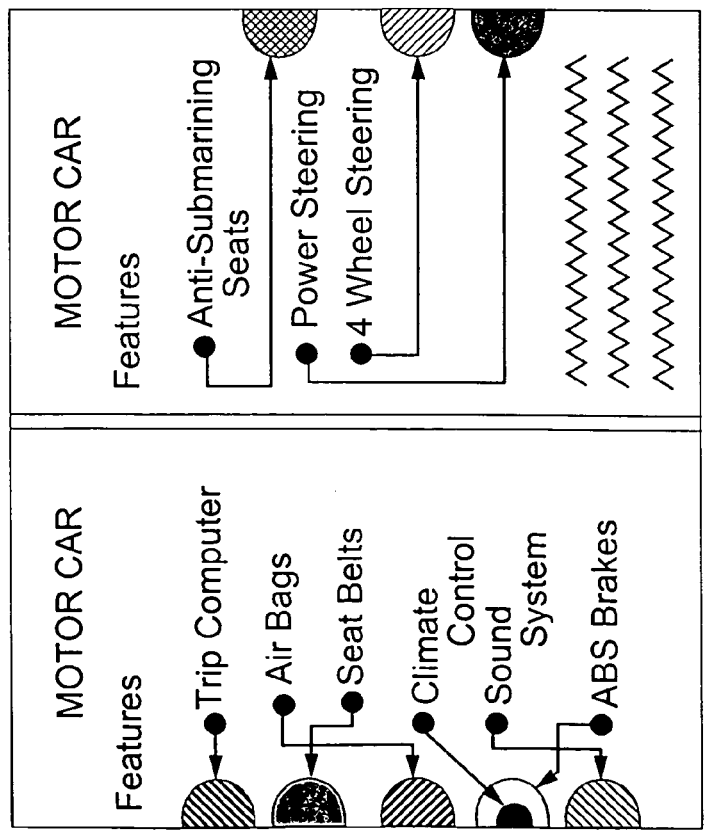
FIG. 10B depicts a modification of the document of FIG. 10A according to a preferred embodiment, where the main knowledge is used to group together hyperlinked information.

FIGS. 10A and 10B illustrate such an arrangement in which FIG. 10A depicts an example hypertext document incorporating physical hyperlinks according to the disclosure of the aforementioned Australian Patent Publication. As seen, the document relates to a motor car and the pages displayed in FIG. 10A depict various features associated with the motor car including trip computer, air bags, seat belts, climate control, sound system, ABS brakes, anti-submarining seats, power steering and four wheel steering. As seen, each link is physically connected to a corresponding cut-out or other physical indicator of the hyperlinked information.

According to the present embodiment and as illustrated in FIG. 10B, the various features shown in FIG. 10A may be grouped according to the particular type of feature depicted. As will be understood by those familiar with motor cars, the various features illustrated in FIG. 10A may be grouped into two categories, those relating to safety features of the motor car, and those relating to the comfort of the user of the motor car. According to the specific embodiment illustrated in FIG. 10B, the various hyperlinks associated with each of the groupings of safety and comfort are combined for the various features indicated on the printed page. As seen, each of the combined hyperlinks refers to a nested arrangement of tabs that may be used in the manner described above to access information relating to the specific features in each grouping.

The embodiment of FIG. 10B relies upon the main knowledge associated with each of the hyperlinks, such knowledge including information regarding the overall grouping for either safety or comfort. A grouping can be used to select or recommend specific graphic symbols, colours, or abbreviated labels and the like associated with any of the cut-out tabs and/or indicia printed upon the page.

In a further embodiment, style sheets and/or style definitions may be used, not only in specifying the presentational style of cut-out tabs used in forming the hyperlinked document, but also in specifying those cut-out tabs that are to be implemented for a particular view of the document.

Existing web technology allows the use of XSL-style sheets (XSL=Extensible Stylesheet Language) to extract various components of XML documents for presentation thereby allowing the presentation of different views of the document. Similarly, and according to the present embodiment, different style sheets may be used in selecting those hyperlinks that are important in generating various views of the hyperprint document. In order to achieve such different views, the hyperlinks are required to be marked up according to their particular role, purpose and level of importance.

For example, such a configuration permits the links and tabs, which form the essence of the hypertext document, to be manipulable (editable) like data in any document. For example, with reference to FIG. 10B, a particular style sheet may provide for the printed hyperlinks (eg. a directional arrow), to be provided in a variety of colours or in some other form such as formed using dashed or dotted lines. A modified style sheet may also provide for alternate shaped cut-out portions such as semi-circular, square, triangular and the like. Style sheets may also be used for modifying any printed colours or patterns associated with nested cut-outs and tabs. Further, and with specific reference to the example of FIG. 10B, a specific style sheet may be used to either include or exclude particular types of information to which hyperlinks may apply. That is, style sheets can be used to select the set of cut-out tabs that should be included in various versions of the document. For example, where desired, those motor car features of FIG. 10B relating to comfort may be excluded in the generation of the hypertext printed document from the electronically hyperlinked source.

The foregoing describes only a number of embodiments of the present invention, and modifications and alternatives can be practiced within the spirit and scope of the invention.

The invention claimed is:

1. A method of creating a document suitable for hard copy reproduction, said method comprising the steps of:

(a) receiving information from at least one electronic source document, the information including a plurality of referential links establishing corresponding referential paths between components of the information;

(b) defining a physical structure of the document suitable for hard copy reproduction and sufficient to reproduce the information;

(c) defining a plurality of document links associated with the physical structure and corresponding to the referential links;

(d) generating a functional link associated with each said document link, wherein each functional link forms a user interpretable and traversable physical path in the document between components of the information thereby corresponding to the received referential links; and (e) grouping a number of the functional links in the document for hard copy reproduction by arranging plural ones of the document links to at least an individual one of the functional links, wherein the physical structure comprises at least one single printable page and the functional links comprise at least one indicium printable onto a single page, and step (e) comprises merging plural ones of the document links to form a single indicium associated with a component on the page.

2. A method according to claim 1, wherein the physical structure comprises plural printable pages and the functional links comprise at least one cut-out tab formed in at least one of the pages, and step (e) comprises assigning plural ones of the document links to a single one of the at least one cut-out tab.

3. A method according to claim 2, wherein at least one cut-out tab is formed as part of a nest of correspondingly located tabs associated with plural ones of the pages.

4. A method according to claim 3, further comprising the step of retaining structure definitions of the document in a template for formatting at least one subsequent document in a corresponding fashion.

5. A method according to claim 3, further comprising the step of defining a presentational style to the document and applying the presentational style to the functional links to distinguish the functional links from the components.

6. A method according to claim 5, further comprising the step of retaining the presentational style of the document in a template for formatting at least one subsequent document with the presentational style.

7. A method according to claim 1, further comprising the step of defining content specific document links and incorporating corresponding functional links into the document.

8. A method according to claim 7, wherein the content specific document links are user defined.

9. A method according to claim 1, further comprising the step of associating a predetermined stylistic layout with the arranged functional links so as to vary a hard-copy reproduction of the document.

10. A method according to claim 9, wherein the predetermined stylistic layout implements a formation of cut-out tabs as at least some of the arranged functional links.

11. A method according to claim 1, wherein step (e) comprises grouping the document links according to predetermined criteria associated with the document links, each group having associated therewith at least one corresponding arranged functional link.

12. A method according claim 1 or 11, wherein step (e) comprises the sub-steps of:
(ea) importing the information into the physical structure to form the document; and
(eb) applying the arranged links to the document.

13. A method according to claim 1, wherein a plurality of the functional links comprise corresponding cut-out tabs linking different pages of the document, and step (e) comprises the sub-steps of:
(ec) identifying those of the document links that either (I) start or (ii) end on respective common pages of the document;
(ed) for each common page, grouping together corresponding document links identified at step (ec); and
(ee) providing a cut-out tab functional link corresponding to each group of document links.

14. A method according to claim 13, wherein substep (ed) further comprises limiting each group of document links to those that either (I) end on different ones of the pages or (ii) start on different ones of the pages, and substep (ee) comprises providing a set of nested cut-out tab functional links, such that each member of the set corresponds to one document link of a corresponding group.

15. A method according to claim 14, wherein the groups are formed based upon a determinable relationship between corresponding components of the information.

16. An authoring system for creating a linear document that includes non-linear referential links, said system including:
means for specifying a linear document structure and hyperlinks of a hypermedia source document;
means for associating the hyperlinks with physical links able to be formed in multiple pages of the linear document;
means for modelling each physical link using a one-dimensional vector reproducible as a reader interpretable and traversable physical path in the linear document thereby functionally corresponding to the corresponding hyperlink; and
means for grouping a number of the physical links in the linear document by arranging a plurality of the hyperlinks to at least an individual one of the physical links spanning at least two of the pages,
wherein the structure comprises at least one single printable page and the physical links comprise at least one indicium printable onto a single page, and step (e) comprises merging plural ones of the physical links to form a single indicium associated with a component on the page.

17. An authoring system for creating a linear document that includes non-linear referential links, said system comprising:
means for assessing hyperlinks within a source hypermedia document to which a linear document structure is to be applied;
means for associating the hyperlinks with physical links able to be formed in multiple pages of the linear document;
means for modelling each physical link using a one-dimensional vector reproducible as a reader interpretable and traversable physical path in the linear document thereby functionally corresponding to the corresponding hyperlinks; and
means for grouping a plurality of at least one of the physical links spanning at least two of the pages to correspond to a plurality of the hyperlinks,
wherein the structure comprises at least one single printable page and the physical links comprise at least one indicium printable onto a single page, and step (e) comprises merging plural ones of the physical links to form a single indicium associated with a component on the page.

18. A system for creating a linear document that includes non-linear referential links, said system comprising:
means for assessing hyperlinks within a source hypermedia document to which a linear document structure is to be applied;
means for associating the hyperlinks with physical links able to be formed in multiple pages of the linear document;
means for modelling each physical link using a one-dimensional vector reproducible as a reader interpretable and traversable physical path in the linear document thereby functionally corresponding to the corresponding hyperlinks;
means for grouping a number of the physical links in the document corresponding to a plurality of the hyperlinks to at least an individual one of the physical links traversing at least two of the pages;
means for applying the linear document structure and the arranged physical links to the hypermedia document to produce the linear document; and
means for reproducing the linear document, wherein the structure comprises at least one single printable page and the physical links comprise at least one indicium printable onto a single page, and step (e) comprises merging plural ones of the physical links to form a single indicium associated with a component on the page.

19. A computer program product embodying a computer-readable program for implementing a method for creating a document suitable for hard copy reproduction, wherein the method comprises the steps of:
   (a) receiving information from at least one electronic source document, the information including a plurality of referential links establishing corresponding referential paths between components of the information;
   (b) defining a physical structure of the document suitable for hard copy reproduction and sufficient to reproduce the information;
   (c) defining a plurality of document links associated with the physical structure and corresponding to the referential links;
   (d) generating a functional link associated with each said document link, wherein each functional link forms a user interpretable and traversable physical path in the document between components of the information thereby corresponding to the received referential links; and
   (e) grouping a number of the functional links in the document by arranging plural ones of the document links to at least an individual one of the functional links, wherein the physical structure comprises at least one single printable page and the functional links comprise at least one indicium printable onto a single page, and step (e) comprises merging plural ones of the document links to form a single indicium associated with a component on the page.

20. A computer program product according to claim 19, wherein the physical structure comprises plural printable pages and the functional links comprise at least one cut-out tab formed in at least one of the pages, and step (e) comprises assigning plural ones of the document links to a single one of the at least one cut-out tab.

21. A computer program product according to claim 20, wherein at least one cut-out tab is formed as part of a nest of correspondingly located tabs associated with plural ones of the pages.

22. A computer program product according to claim 21, wherein the method further comprises the step of retaining structure definitions of the document in a template for formatting at least one subsequent document in a corresponding fashion.

23. A computer program product according to claim 21, wherein the method further comprises the step of defining a presentational style to the document and applying the presentational style to the functional links to distinguish the functional links from the components.

24. A computer program product according to claim 23, wherein the method further comprises the step of retaining the presentational style of the document in a template for formatting at least one subsequent document with the presentational style.

25. A computer program product according to claim 19, wherein the method further comprises the step of defining content specific document links and incorporating corresponding functional links into the document.

26. A computer program product according to claim 25, wherein the content specific document links are user defined.

27. A computer program product according to claim 19, further comprising the step of associating a predetermined stylistic layout with the arranged functional links so as to vary a hard-copy reproduction of the document.

28. A computer program product according to claim 27, wherein the predetermined stylistic layout implements a formation of cut-out tabs as at least some of the arranged functional links.

29. A computer program product according to claim 19, wherein step (e) comprises grouping the document links according to predetermined criteria associated with the document links, each group having associated therewith at least one corresponding arranged functional link.

30. A computer program product according to claim 19, wherein step (e) comprises the sub-steps of:
   (ea) importing the information into the physical structure to form the document; and
   (eb) applying the arranged links to the document.

31. A computer program product according to claim 19, wherein a plurality of the functional links comprises corresponding cut-out tabs linking different pages of the document, and step (e) comprises the sub-steps of:
   (ec) identifying those of the document links that either (I) start or (ii) end on respective common pages of the document;
   (ed) for each common page, grouping together corresponding document links identified at step (ec); and
   (ee) providing a cut-out tab functional link corresponding to each group of document links.

32. A computer program product according to claim 31, wherein step (ed) further comprises limiting each group of document links to those that either (I) end on different ones of the pages or (ii) start on different ones of the pages, and step (ee) comprises providing a set of nested cut-out tab functional links, such that each member of the set corresponds to one document link of a corresponding group.

33. A computer program product according to claim 32, wherein the groups are formed based upon a determinable relationship between corresponding components of the information.

34. A system for creating a document suitable for hard copy reproduction, said system comprising:
   first means for receiving information from at least one electronic source document, the information including a plurality of referential links establishing corresponding referential paths between components of the information;
   second means for defining a physical structure of the document suitable for hard copy reproduction and sufficient to reproduce the information;
   third means for defining a plurality of document links associated with the physical structure and corresponding to the referential links;
   fourth means for generating a functional link associated with each said document link, wherein each functional link forms a user interpretable and traversable physical path in the document between components of the information thereby corresponding to the received referential links; and
   fifth means for grouping a number of the functional links in the document for hard copy reproduction by arranging plural ones of the document links to at least an individual one of the functional links,
   wherein the physical structure comprises at least one single printable page and the functional links comprise at least one indicium printable onto a single page, and said fifth means comprises means for merging plural ones of the document links to form a single indicium associated with a component on the page.

35. A system according to claim 34, wherein the physical structure comprises plural printable pages and the functional links comprise at least one cut-out tab formed in at least one of the pages, and said fifth means comprises means for assigning plural ones of the document links to a single one of the at least one cut-out tab.

36. A system according to claim 35, wherein at least one cut-out tab is formed as part of a nest of correspondingly located tabs associated with plural ones of the pages.

37. A system according to claim 36, further comprising means for retaining structure definitions of the document in a template for formatting at least one subsequent document in a corresponding fashion.

38. A system according to claim 36, further comprising means for defining a presentational style to the document and for applying the presentational style to the functional links to distinguish the functional links from the components.

39. A system according to claim 38, further comprising means for retaining the presentational style of the document in a template for formatting at least one subsequent document with the presentational style.

40. A system according to claim 34, further comprising means for defining content specific document links and incorporating corresponding functional links into the document.

41. A system according to claim 40, wherein the content specific document links are user defined.

42. A system according to claim 34, further comprising means for associating a predetermined stylistic layout with the arranged functional links so as to vary a hard-copy reproduction of the document.

43. A system according to claim 42, wherein the predetermined stylistic layout implements a formation of cut-out tabs as at least some of the arranged functional links.

44. A system according to claim 43, wherein said fifth means comprises means for grouping the document links according to predetermined criteria associated with the document links, each group having associated therewith at least one corresponding arranged functional link.

45. A system according to claim 34, wherein said fifth means comprises:

means for importing the information into the physical structure to form the document; and means for applying the arranged links to the document.

46. A system according to claim 34, wherein a plurality of the functional links comprises corresponding cut-out tabs linking different pages of the document, and said fifth means comprises:

means for identifying those of the document links that either (I) start or (ii) end on respective common pages of the document;

means for grouping together, for each common page, corresponding document links identified by the means for identifying; and means for providing a cut-out tab functional link corresponding to each group of document links.

47. A system according to claim 46, further comprising means for limiting each group of document links to those that either (I) end on different ones of the pages or (ii) start on different ones of the pages, and means for providing a set of nested cut-out tab functional links, such that each member of the set corresponds to one document link of a corresponding group.

48. A system according to claim 47, wherein the groups are formed based upon a determinable relationship between corresponding components of the information.

\* \* \* \* \*

UNITED STATES PATENT AND TRADEMARK OFFICE
CERTIFICATE OF CORRECTION

PATENT NO. : 7,017,108 B1 Page 1 of 1
APPLICATION NO. : 09/392550
DATED : March 21, 2006
INVENTOR(S) : Ernest Yiu Cheong Wan It is certified that error appears in the above-identified patent and that said Letters Patent is hereby corrected as shown below:

Column 11

Line 51, "(I)" should read --(i)--.
Line 60, "(I)" should read --(i)--.

Column 14

Line 23, "(I)" should read --(i)--.
Line 32, "(I)" should read --(i)--.

Column 16

Line 17, "(I)" should read --(i)--.
Line 27, "(I)" should read --(i)--.

Signed and Sealed this

Twenty-seventh Day of February, 2007

JON W. DUDAS
*Director of the United States Patent and Trademark Office*